(12) United States Patent
Zhang

(10) Patent No.: US 9,009,735 B2
(45) Date of Patent: Apr. 14, 2015

(54) METHOD FOR PROCESSING DATA, COMPUTING NODE, AND SYSTEM

(71) Applicant: Huawei Technologies Co., Ltd., Shenzhen (CN)

(72) Inventor: Tianhu Zhang, Dublin (IE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/080,954

(22) Filed: Nov. 15, 2013

(65) Prior Publication Data

US 2014/0137136 A1 May 15, 2014

Related U.S. Application Data

(63) Continuation of application No. PCT/CN2013/074507, filed on Apr. 22, 2013.

(30) Foreign Application Priority Data

Nov. 15, 2012 (CN) .......................... 2012 1 0460097

(51) Int. Cl.
*G06F 9/54* (2006.01)
(52) U.S. Cl.
CPC ...................................... *G06F 9/542* (2013.01)
(58) Field of Classification Search
None
See application file for complete search history.

(56) References Cited

U.S. PATENT DOCUMENTS

| 2005/0177716 | A1* | 8/2005 | Ginter et al. | 713/157 |
| 2008/0222654 | A1* | 9/2008 | Xu et al. | 719/318 |
| 2008/0228536 | A1* | 9/2008 | Suenbuel et al. | 705/7 |
| 2009/0064185 | A1 | 3/2009 | Araujo | |
| 2009/0070786 | A1* | 3/2009 | Alves et al. | 719/318 |
| 2009/0171720 | A1 | 7/2009 | Crook et al. | |

(Continued)

FOREIGN PATENT DOCUMENTS

| CN | 102761602 A | 10/2012 |
| CN | 102930046 A | 2/2013 |

OTHER PUBLICATIONS

Foreign Communication From a Counterpart Application, PCT Application No. PCT/CN2013/074507, Chinese Search Report dated Aug. 22, 2013, 6 pages.

(Continued)

*Primary Examiner* — Tuan Dao
(74) *Attorney, Agent, or Firm* — Conley Rose, P.C.; Grant Rodolph

(57) ABSTRACT

Embodiments of the present invention provide a method for processing data, a computing node, and a system. The method includes: registering, by a BPE, an algorithm with a CEP instance; transferring, by the CEP instance when detecting that an event concerned by the algorithm satisfies a computation-triggering condition, an event required for computation to the BPE; obtaining, by the BPE, a computation result, and if determining that a further computation is required for the computation result, writing the computation result as an intermediate event to the CEP instance; and transferring, by the CEP instance when detecting that an event concerned by another algorithm satisfies a computation-triggering condition thereof and the intermediate event is an event required for computation thereof, the intermediate event to a BPE that registers the another algorithm. The CEP instance performs association of multiple events and multiple algorithms, which simplifies a computation process and improves timeliness.

20 Claims, 9 Drawing Sheets

(56) References Cited

U.S. PATENT DOCUMENTS

| | | | |
|---|---|---|---|
| 2009/0287628 A1 | 11/2009 | Indeck et al. | |
| 2010/0070981 A1* | 3/2010 | Hadar et al. | 719/318 |
| 2012/0030160 A1* | 2/2012 | Ratnam et al. | 706/47 |
| 2012/0272249 A1* | 10/2012 | Beaty et al. | 719/318 |
| 2013/0339984 A1* | 12/2013 | Grumann | 719/318 |

OTHER PUBLICATIONS

Foreign Communication From a Counterpart Application, PCT Application No. PCT/CN2013/074507, Chinese Written Opinion dated Aug. 22, 2013, 5 pages.

Zaharia, M., et al., "Resilient Distributed Datasets: A Fault-Tolerant Abstraction for In-Memory Cluster Computing," Proceedings of the 9th USENIX conference on Networked Systems Design and Implementation, 2012, 14 pages.

Brito, A., et al., "Scalable and Low-Latency Data Processing with StreamMapReduce," Third IEEE International Conference on Coud Computing Technology and Science, Dec. 31, 2011, pp. 48-58.

Foreign Communication From a Counterpart Application, Chinese Application No. 201210460097.5, Chinese Office Action dated Jan. 4, 2015, 7 pages.

Yang, J., et al., "Scalable Complex Event Processing on Top of MapReduce," Web Technologies and Applications, XP019175580, Apr. 11, 2012, 8 pages.

Foreign Communication from a Counterpart Application, European Application No. 13786611.7, Extended European Search Report dated Nov. 18, 2014, 8 pages.

\* cited by examiner

METHOD FOR PROCESSING DATA, COMPUTING NODE, AND SYSTEM

CROSS-REFERENCE TO RELATED APPLICATION

This application is a continuation of International Application No. PCT/CN2013/074507, filed on Apr. 22, 2013, which claims priority to Chinese Patent Application No. 201210460097.5, filed on Nov. 15, 2012, both of which are hereby incorporated by reference in their entireties.

TECHNICAL FIELD

Embodiments of the present invention relate to the data computing field, and in particular, to a method for processing data, a computing node, and a system.

BACKGROUND

The Hadoop technology is a distributed computing platform that comes out in recent years for processing massive data, and has a great advantage in massive data processing and in reliability. Hadoop is a software framework that is capable of performing distributed processing on a large amount of data in a reliable, highly efficient, and scalable manner. Hadoop is reliable because it maintains multiple copies of operational data based on an assumption that element computation and storage may fail, to ensure that distributed processing on a failed node can be performed again. Hadoop is highly efficient because it operates in a parallel manner, thereby accelerating processing by using parallel processing. Hadoop is also scalable and is capable of processing data in petabytes (PB).

Key performance indicator (KPI)/key quality indicator (KQI) computing often requires an association to be created between multiple events, that is, multiple events are associated based on a specific dimension, and a KPI/KQI is generated only when a condition is satisfied. However, Hadoop is not properly supported in solving such a problem, where a complex operation of Map Reduce (MR) is performed for multiple times to generate more intermediate files, so as to achieve a partial result. Moreover, MR is weak in timeliness. All intermediate results need to be written to a Hadoop file system (HDFS) by performing input/output (IO), and then read for participating in a next computation. IO becomes a bottleneck for processing massive data and real-time performance is degraded.

SUMMARY

Embodiments of the present invention provide a method for processing data, a computing node, and a system, which are used to solve, to a certain extent, the problem of degrading real-time performance caused by a complex operation of multiple MRs required by an association computation in existing Hadoop.

In a first aspect, an embodiment of the present invention provides a method for processing data, where the method is applied to a business processor entity (BPE), the method including: registering a predefined algorithm of the BPE with a complex event processing (CEP) instance located on a computing node which is the same as the computing node which the BPE is located on, where the predefined algorithm of the BPE includes an identifier of a concerned event, an identifier of an event required for computation, and a computation-triggering condition; the identifier of the concerned event is used to identify an event concerned by the predefined algorithm; and the identifier of the event required for computation is used to identify an event required for computation of the predefined algorithm; obtaining the event that is required for computation of the predefined algorithm and that is transferred by the CEP instance, where the event required for computation of the predefined algorithm is transferred by the CEP instance when detecting that the event concerned by the predefined algorithm satisfies the computation-triggering condition; performing a computation on the event required for computation of the predefined algorithm according to the predefined algorithm to obtain a computation result; and if determining, according to predefined service logic, that a further computation needs to be performed on the computation result, writing the computation result as an intermediate event to the CEP instance, so that the CEP instance transfers, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance.

In a first possible implementation manner of the first aspect, after performing the computation on the event required for computation of the predefined algorithm according to the predefined algorithm to obtain the computation result, the method further includes: transferring the computation result to a data storage processor entity (DPE), so that the DPE saves the computation result to a database, where the DPE is located on the computing node or another computing node.

With reference to the first possible implementation manner of the first aspect, in a second possible implementation manner of the first aspect, transferring the computation result to the data storage processor entity DPE includes: determining, according to the predefined service logic, whether the computation result needs to be summed, and if the computation result needs to be summed, transferring the computation result to an arithmetic processor entity (APE), so that the APE performs a summation computation on the computation result of the BPE and a computation result of another BPE, and transfers the summation result to the DPE, where the APE is located on the computing node or another computing node, and the APE and the DPE are located on the same computing node or on different computing nodes.

In a second aspect, an embodiment of the present invention provides a method for processing data, where the method is applied to a complex event processing CEP instance, the method including: registering a predefined algorithm of a business processor entity BPE located on a computing node which is the same as the computing node which the CEP instance is located on, where the predefined algorithm of the BPE includes an identifier of a concerned event, an identifier of an event required for computation, and a computation-triggering condition; the identifier of the concerned event is used to identify an event concerned by the predefined algorithm; and the identifier of the event required for computation is used to identify an event required for computation of the predefined algorithm; transferring, when detecting that the event concerned by the predefined algorithm satisfies the computation-triggering condition, the event required for computation of the predefined algorithm to the BPE, so that the BPE performs a computation on the event required for computation of the predefined algorithm according to the predefined algorithm to obtain a computation result; obtaining the computation result written by the BPE, where the computation result is written as an intermediate event by the BPE when determining, according to predefined service logic, that a further computation needs to be performed on the computation result; and transferring, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance.

In a first possible implementation manner of the second aspect, the event concerned by the predefined algorithm includes an original event concerned by the predefined algorithm and an intermediate event concerned by the predefined algorithm, and before the detecting that the event concerned by the predefined algorithm satisfies the computation-triggering condition, the method further includes: extracting the original event concerned by the predefined algorithm from a message bus; and detecting, by the CEP instance, whether the original event concerned by the predefined algorithm and the intermediate event concerned by the predefined algorithm satisfy the computation-triggering condition.

In a third aspect, an embodiment of the present invention provides a method for processing data, where the method is applied to a computing node including a business processor entity BPE and a complex event processing CEP instance, the method including: registering, by the BPE, a predefined algorithm of the BPE with the CEP instance, where the predefined algorithm includes an identifier of a concerned event, an identifier of an event required for computation, and a computation-triggering condition; the identifier of the concerned event is used to identify an event concerned by the predefined algorithm; and the identifier of the event required for computation is used to identify an event required for computation of the predefined algorithm; transferring, by the CEP instance when detecting that the event concerned by the predefined algorithm satisfies the computation-triggering condition, the event required for computation of the predefined algorithm to the BPE; performing, by the BPE, a computation on the event required for computation of the predefined algorithm according to the predefined algorithm to obtain a computation result; and if the BPE determines, according to predefined service logic, that a further computation needs to be performed on the computation result, writing the computation result as an intermediate event to the CEP instance; and transferring, by the CEP instance when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance.

In a first possible implementation manner of the third aspect, after the performing, by the BPE, the computation on the event required for computation of the predefined algorithm according to the predefined algorithm to obtain the computation result, the method further includes: transferring, by the BPE, the computation result to a data storage processor entity DPE, so that the DPE saves the computation result to a database, where the DPE is located on the computing node or another computing node.

With reference to the first possible implementation manner of the third aspect, in a second possible implementation manner of the third aspect, before the detecting, by the CEP instance, that the event concerned by the predefined algorithm satisfies the computation-triggering condition, the method further includes: extracting an original event from a message bus; and detecting, by the CEP instance, whether the event concerned by the predefined algorithm among the extracted original event and the written intermediate event satisfies the computation-triggering condition.

With reference to the second possible implementation manner of the third aspect, in a third possible implementation manner of the third aspect, extracting an original event from the message bus includes: receiving original events concerned by algorithms of all BPEs on the computing node, where the original events are sent by a message server according to a subscription instruction of a scheduler; or extracting, by an event filter located on the computing node, from the message bus according to a subscription configuration of a scheduler, original events concerned by algorithms of all BPEs on the computing node, and transferring the original events to the CEP instance.

With reference to any one of the possible implementation manners of the third aspect, in a fourth possible implementation manner of the third aspect, the transferring, by the BPE, the computation result to the data storage processor entity DPE includes: determining, by the BPE according to the predefined service logic, whether the computation result needs to be summed, and if the computation result needs to be summed, transferring the computation result to an arithmetic processor entity APE, so that the APE performs a summation computation on the computation result of the BPE and a computation result of another BPE, and transfers the summation result to the DPE, where the APE is located on the computing node or another computing node, and the APE and the DPE are located on the same computing node or on different computing nodes.

With reference to the fourth possible implementation manner of the third aspect, in a fifth possible implementation manner of the third aspect, after the performing, by the APE, the summation computation on the computation result of the BPE and a computation result of another BPE, the method further includes: if the APE determines, according to the predefined service logic, that a further computation needs to be performed on the summation result, writing, by the APE, the summation result as an intermediate event to a CEP instance located on a computing node which is the same as the computing node which the APE is located on.

In a fourth aspect, an embodiment of the present invention provides a computing node, including a business processor entity BPE and a complex event processing CEP instance, where the BPE is configured to register a predefined algorithm of the BPE with the CEP instance, where the predefined algorithm includes an identifier of a concerned event, an identifier of an event required for computation, and a computation-triggering condition; the identifier of the concerned event is used to identify an event concerned by the predefined algorithm; and the identifier of the event required for computation is used to identify an event required for computation of the predefined algorithm; the CEP instance is configured to transfer, when detecting that the event concerned by the predefined algorithm satisfies the computation-triggering condition, the event required for computation of the predefined algorithm to the BPE; the BPE is further configured to perform a computation on the event required for computation of the predefined algorithm according to the predefined algorithm to obtain a computation result, and if determining, according to predefined service logic, that a further computation needs to be performed on the computation result, write the computation result as an intermediate event to the CEP instance; and the CEP instance is further configured to transfer, when detecting that an event concerned by another registered algorithm other than the predefined algorithm satisfies the computation-triggering condition in the predefined algorithm, the intermediate event to a BPE which is located on the computing node and registers the another algorithm with the CEP instance.

In a first possible implementation manner of the fourth aspect, the BPE is further configured to send the computation result to a data storage processor entity DPE on another computing node, so that the DPE saves the computation result to a database; or the computing node further includes a DPE, and the BPE is further configured to send the computation result to the DPE on the same computing node, so that the DPE saves the computation result to a database.

With reference to the fourth aspect or the first possible implementation manner of the fourth aspect, in a second possible implementation manner of the fourth aspect, the CEP instance is further configured to: extract an original event from a message bus; and detect whether the event concerned by the predefined algorithm among the extracted original event and the written intermediate event satisfies the computation-triggering condition.

With reference to the second possible implementation manner of the fourth aspect, in a third possible implementation manner of the fourth aspect, the CEP instance is specifically configured to: receive original events concerned by algorithms of all BPEs on the computing node, where the original events are sent by a message server according to a subscription instruction of a scheduler; detect whether the event concerned by the predefined algorithm among the original events and the written intermediate event satisfies the computation-triggering condition; and when detecting that the computation-triggering condition is satisfied, transfer the event required for computation of the predefined algorithm to the BPE; and is configured to transfer, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance; or the computing node further includes an event filter, where the event filter is configured to extract, from the message bus according to a subscription configuration of a scheduler, original events concerned by algorithms of all BPEs on the computing node, and transfer the original events to the CEP instance; and the CEP instance is specifically configured to receive the original events transferred by the event filter; detect whether the event concerned by the predefined algorithm among the original events and the written intermediate event satisfies the computation-triggering condition; and when detecting that the computation-triggering condition is satisfied, transfer the event required for computation of the predefined algorithm to the BPE; and is configured to transfer, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance.

With reference to the fourth aspect or any one of the possible implementation manners of the fourth aspect, in a fourth possible implementation manner of the fourth aspect, the BPE is further configured to determine, according to predefined service logic, whether the computation result needs to be summed; and if the computation result needs to be summed, send the computation result to an arithmetic processor entity APE on another computing node, so that the APE performs a summation computation on the computation result of the BPE and a computation result of another BPE, and transfers a summation result to the DPE; or the computing node further includes an APE, and the BPE is further configured to determine, according to predefined service logic, whether the computation result needs to be summed; and if the computation result needs to be summed, send the computation result to the APE on the same computing node, so that the APE performs a summation computation on the computation result of the BPE and a computation result of another BPE, and transfers a summation result to the DPE, where the APE and the DPE are located on the same computing node or on different computing nodes.

With reference to the fourth possible implementation manner of the fourth aspect, in a fifth possible implementation manner of the fourth aspect, the APE is further configured to write, if determining, according to the predefined service logic, that a further computation needs to be performed on the summation result, the summation result as an intermediate event to a CEP instance on the same computing node.

In a fifth aspect, an embodiment of the present invention provides a distributed computing system, including: a scheduler and at least one computing node, where each computing node is the computing node described above; and the scheduler is configured to collect resource information of each computing node, determine a scheduling mode for each computing node according to the resource information, and respectively schedule each computing node according to the scheduling mode of each computing node.

In a first possible implementation manner of the fifth aspect, the scheduling mode includes a predefined algorithm, predefined service logic, and whether to enable a business processor entity BPE, an arithmetic processor entity APE, or a data storage processor entity DPE on the computing node.

With reference to the fifth aspect or the first possible implementation manner of the fifth aspect, in a second possible implementation manner of the fifth aspect, there are multiple computing nodes; and the scheduler is specifically configured to reserve a computing node as a standby computing node; schedule other computing nodes than the standby computing node; and when one of the other computing nodes that are scheduled becomes abnormal, schedule the standby computing node according to a scheduling mode of the abnormal computing node and cached data of the abnormal computing node.

At least one technical solution among the multiple technical solutions described above has the following advantages or benefits.

The embodiments of the present invention use a technical means where a business processor entity (BPE) on a computing node registers a predefined algorithm of the BPE with a complex event processing (CEP) instance on the computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process, and improves timeliness.

BRIEF DESCRIPTION OF DRAWINGS

To illustrate the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
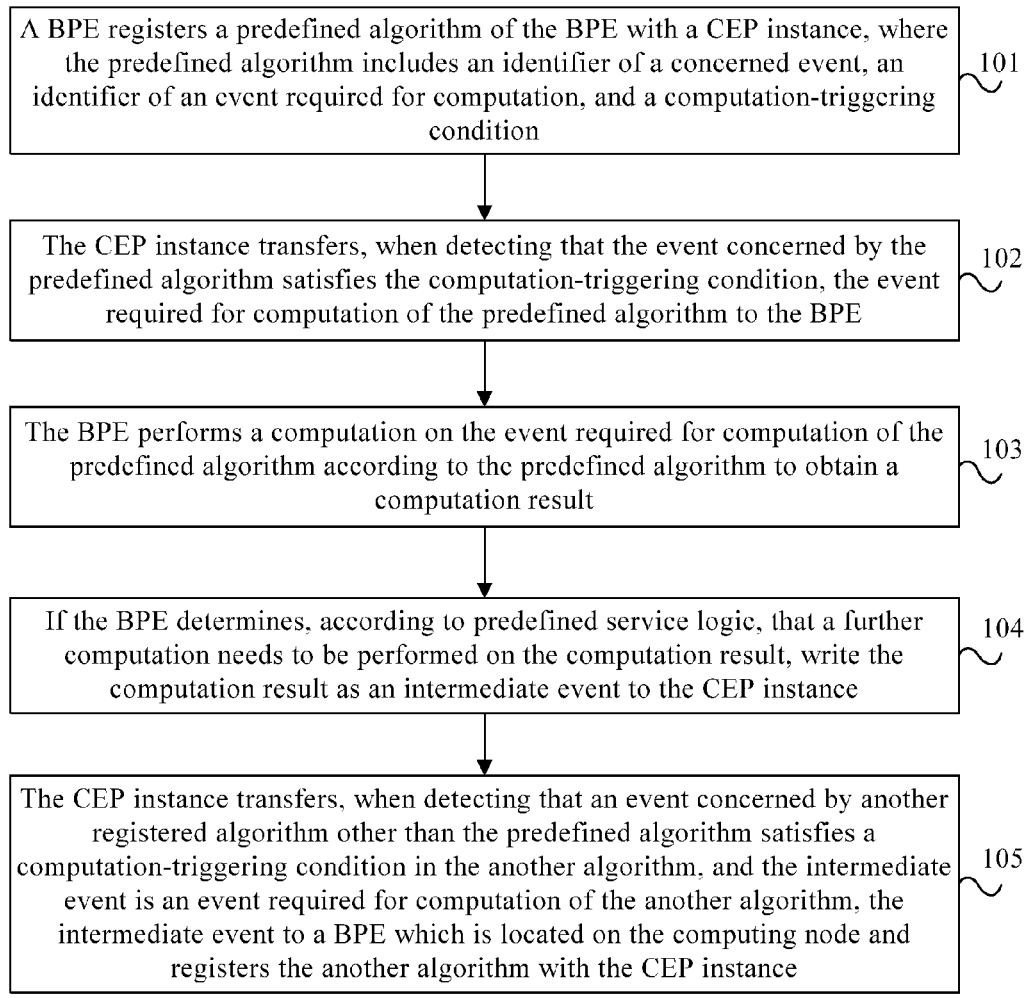
FIG. 1 is a schematic flowchart of a method for processing data according to an embodiment of the present invention.

FIG. 1 is a schematic flowchart of a method for processing data according to an embodiment of the present invention. The method is applied to a computing node including a BPE and a CEP instance. As shown in FIG. 1, the method includes the following steps.

101. A BPE registers a predefined algorithm of the BPE with a CEP instance, where the predefined algorithm includes an identifier of a concerned event, an identifier of an event required for computation, and a computation-triggering condition.

In the embodiment of the present invention, functions of the BPE include computing a KPI/KQI, analyzing user signaling, and the like. The BPE and the CEP instance may be together deployed on each computing node. For example, the computing node in the embodiment of the present invention may be a blade entity (where a product form thereof may be a board) of a blade system, which may also be referred to as a physical node. The predefined algorithm is an algorithm for computing a KPI/KQI or an algorithm for analyzing signaling that the BPE is responsible for. An algorithm may also be referred to as a function or business logic.

For example, a computation for any KPI may be represented as K=f(IE1, IE2, IE3 . . . ), where K is a KPI, f is a function, and an information element (IE for short) is an event parameter or a combination of some event parameters in a network, which is commonly available in the following cases: (1) compute a sum of the number of bytes: IE=SUM (EVENT.x); (2) compute an average duration, where a cross-network element case is similar: IE=AVG(EVENT1.T–EVENT2.T); and (3) compute times, for example times of error codes: IE=count(EVENT)

Any KPI may be computed in two steps: (1) combining event (Event) parameters in a set to compute an IE; and (2) performing an operation on the IE to obtain the KPI.

The predefined algorithm may be represented in a form of an entity query language (EQL) statement, including an identifier of an event concerned by the algorithm, an identifier of an event required for computation of the algorithm, a computation-triggering condition, and the like. Specifically, the identifier of the concerned event is used to identify an event concerned by the predefined algorithm, and the identifier of the event required for computation is used to identify an event required for computation of the predefined algorithm.

102. The CEP instance transfers, when detecting that the event concerned by the predefined algorithm satisfies the computation-triggering condition, the event required for computation of the predefined algorithm to the BPE.

The computation-triggering condition in the predefined algorithm is a condition for starting a computation of the predefined algorithm. A computation according to the predefined algorithm is started only when the event concerned by the predefined algorithm satisfies the computation-triggering condition.

103. The BPE performs a computation on the event required for computation of the predefined algorithm according to the predefined algorithm to obtain a computation result.

For example, the algorithm of the BPE concerns two events: EVENT1{ID,TIME,VOLUMN} and EVENT2{TIME,SUCCESS}, and the following algorithm needs to be implemented: when SUCCESS in EVENT2 is true and TIME in EVENT2 is equal to TIME in EVENT1, a value of accumulating VOLUMN in EVENT1 within 10 minutes is computed, and the number of EVENT1 events is computed. In such cases, the BPE registers the following EQL statement with the CEP instance to implement the algorithm thereof:

Select Event1.id, count(*), sum(Event1.Volumn) from Event1.win_batch(10 min) where Event1.time=Event2.time And Event2.Success=1.

In such cases, the CEP instance traces EVENT1 and EVENT2; when SUCCESS in EVENT2 is true and TIME in EVENT2 is equal to TIME in EVENT1, that is, EVENT1 and EVENT2 concerned by the algorithm both satisfy the computation-triggering condition, transfers the event EVENT1 required for computation of the algorithm to the BPE; and the BPE accumulates a value of VOLUMN in EVENT1 according to the algorithm, counts the number of EVENT1 events, and obtains a computation result corresponding to Event1.id, count(*), sum(Event1.Volumn) every 10 minutes, which is a KPI record.

104. If the BPE determines, according to predefined service logic, that a further computation needs to be performed on the computation result, write the computation result as an intermediate event to the CEP instance.

Whether a further computation needs to be performed on the computation result depends on predefined service logic. For example, a further computation needs to be performed on some computation results as primary KPIs, so as to obtain a high-level KPI. Therefore, these primary KPIs are related to another high-level KPI algorithm according to the service logic, and accordingly a further computation needs to be performed on the computation result of these primary KPIs. Normally, the further computation is performed on the computation result by another BPE according to an algorithm thereof. If the further computation needs to be performed on the computation result, the computation result may be understood as an intermediate computation result.

It should be understood that in the embodiment of the present invention, the intermediate computation result is written as an intermediate event to the CEP instance. It can be seen that, all intermediate results are saved in a memory or a distributed cache. Compared with the existing Hadoop technology where all intermediate computation results are written to a database and then read from the database for performing a further computation, the embodiment of the present invention reduces unnecessary I/O operations, thereby improving timeliness.

105. The CEP instance transfers, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance.

Specifically, in the embodiment of the present invention, the CEP instance determines an association between an event and an algorithm according to an event concerned by, an event required for computation of, and a computation-triggering condition of the registered algorithm, so as to implement association between multiple events and multiple algorithms. Each computing node may be deployed with one or more BPEs, and each BPE registers an algorithm thereof with a CEP instance deployed on the same computing node. It should be understood that, being located on a computing node and being deployed on a computing node mentioned in this specification refer to the same technical meaning, which may both be understood as being deployed as software logic on a physical entity, or be included as software logic in a physical entity.

Further, after the computation is completed in step 103, the computation result further needs to be saved to a database. In the embodiment of the present invention, a data storage processor entity (DPE for short) is used to save data to a database. Correspondingly, after 103, the method further includes: transferring, by the BPE, the computation result to a DPE, so that the DPE saves the computation result to a database.

The DPE and the BPE may be deployed on the same computing node, and may also be deployed on different computing nodes, which is not limited in the embodiment. Specifically, the database herein may be a local database of the computing node where the DPE is located, or be a shared database in a distributed computing system. It should be noted that after 103, the BPE determines, according to the predefined service logic, whether a further computation needs to be performed on the computation result; and if yes, steps of transferring the computation result to the DPE for saving to the database and of writing, in 104, the computation result as the intermediate event to the CEP instance may be performed in parallel; otherwise, only the step of transferring the computation result to the DPE for saving to the database needs to be performed.

It should be understood that in the embodiment of the present invention, an object saved to the database is the computation result for which a primary operation is performed, thereby achieving a high data reduction ratio, reducing an impact of an online analytical processing (OLAP for short) operation on the database, and reducing the amount of data stored in the database.

In addition, it should be noted that an event concerned by an algorithm may include an original event, and may also include an intermediate event. Correspondingly, in 102 and 105, the CEP instance simultaneously detects whether the event concerned by the algorithm among the original event and the intermediate event satisfies the computation-triggering condition. Correspondingly, before 102, the method further includes: extracting, by the CEP instance, an original event from a message bus; and detecting, by the CEP instance, whether the event concerned by the predefined algorithm among the extracted original event and the written intermediate event satisfies the computation-triggering condition.

Normally, an event source releases an original event to a message bus in a broadcast manner, where the event source may be a network probe or a deep package inspection (DPI) server.

Further, extracting the original event from the message bus specifically includes: receiving original events concerned by algorithms of all BPEs on the computing node, where the original events are sent by a message server according to a subscription instruction of a scheduler; or extracting, by an event filter located on the computing node, from the message bus according to a subscription configuration of a scheduler, original events concerned by algorithms of all BPEs on the computing node, and transferring the original events to the CEP instance.

Specifically, a scheduler may notify the BPE of each computing node of an algorithm to be enabled, an event concerned by the algorithm, and an event to be correspondingly subscribed to from the message bus, which is a process of subscription and releasing. Two manners are available for the subscription and releasing: 1. implementing subscription and releasing at an application layer, that is, a message server directly sends a concerned original event to the CEP instance; and 2. implementing subscription to a message under Layer 2 of a network, that is, an event filter extracts, by controlling a network adapter on the computing node, a concerned original event from a message bus, where this method is highly efficient but requires coordination of hardware. Normally, a CEP instance on a computing node extracts events concerned by algorithms of all BPEs on the computing node from a message bus. For example, when all BPEs on a computing node concern only EVENT1 and EVENT2, a CEP instance on the computing node extracts only EVENT1 and EVENT2 from a message bus, but does not extract EVENT3; when an algorithm of one BPE of two BPEs on a computing node concerns EVENT1 while an algorithm of the other BPE concerns EVENT2, a CEP instance on the computing node also extracts EVENT1 and EVENT2 from a message bus.

It should be noted that if an algorithm concerns only an original event, a CEP instance detects only an original event concerned by the algorithm for the algorithm; if an algorithm concerns only an intermediate event, a CEP instance detects only an intermediate event concerned by the algorithm for the algorithm. Further, considering that events of a certain type exist in large quantities, and a computation on the events of this type cannot be completed on one computing node, the events of this type need to be classified according to certain criteria for performing a computation by BPEs on different computing nodes; after the BPEs complete the computation, results are summed. Therefore, a processor entity (PE for short), for example, an arithmetic processor entity (APE for short), may be set for summing computation results.

Figure 2:
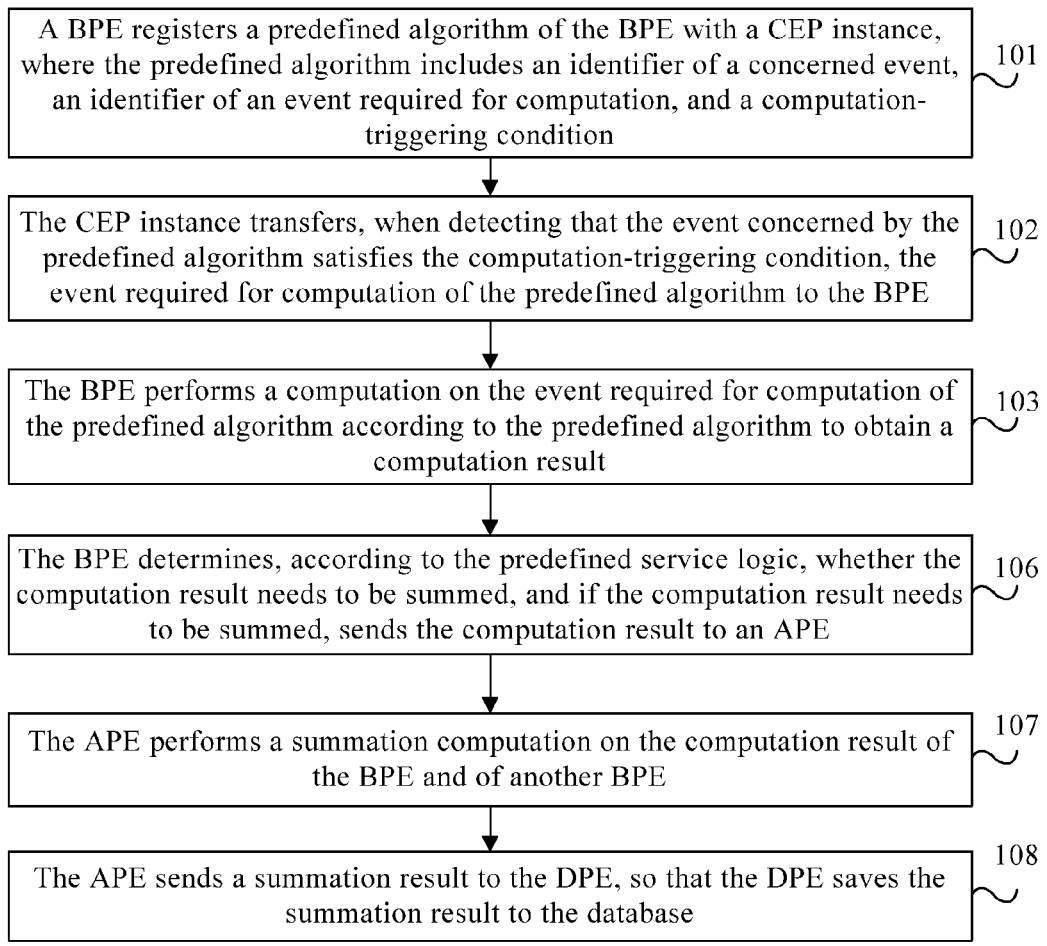
FIG. 2 is a schematic flowchart of another method for processing data according to an embodiment of the present invention.

FIG. 2 is a schematic flowchart of another method for processing data according to an embodiment of the present invention. Based on the embodiment described above, as shown in FIG. 2, after 101 to 103, the method further includes the following steps.

106. The BPE determines, according to the predefined service logic, whether the computation result needs to be summed, and if the computation result needs to be summed, sends the computation result to an APE.

Specifically, the APE responsible for performing a summation computation and the BPE responsible for performing a computation may be deployed on the same computing node, and may also be deployed on different computing nodes. The BPE determines, according to the predefined service logic, whether to send the computation result to an APE on the same computing node or an APE on another computing node. Normally, if an APE on a computing node which is the same as the computing node which the BPE is located on is also enabled, preferably, service logic is designed to enable the BPE to send the computation result to the APE on the same computing node for performing a summation computation.

It should be noted that if the BPE determines, according to the predefined service logic, not to sum the computation result, the computation result is directly transferred to the DPE for saving to the database. In addition, 104 to 105 and 106 to 108 may be performed in parallel.

107. The APE performs a summation computation on the computation result of the BPE and a computation result of another BPE.

Specifically, the another BPE may be deployed on a computing node which is the same as the computing node which the APE and the BPE are located on, and may also be deployed on different computing nodes. Preferably, the APE responsible for performing a summation computation and BPEs whose computation results needs to be summed by the APE are deployed on the same computing node.

108. The APE sends a summation result to the DPE, so that the DPE saves the summation result in the database.

Specifically, the APE responsible for performing a summation computation and the DPE responsible for saving data to a database may be deployed on the same computing node, and may also be deployed on different computing nodes. The APE determines, according to the predefined service logic, whether to send the summation result to a DPE on the same computing node or a DPE on another computing node. Normally, if a DPE on a computing node which is the same as the computing node which the APE is located on is also enabled, to reduce network communication traffic across physical nodes, preferably, it is preferably ensured in design that the APE sends the summation result to a DPE on the same computing node for saving to the database.

Under some scenarios, a further computation may further be performed on the summation result. After 107, the method further includes: if the APE determines, according to the predefined service logic, that a further computation needs to be performed on the summation result, writing, by the APE, the summation result as an intermediate event to a CEP instance located on a computing node which is the same as the computing node which the APE is located on.

It should be noted that when a computing node is deployed with both a BPE and an APE, an intermediate event written to a CEP instance on the computing node further includes, besides an intermediate event written by the BPE, an intermediate event written by the APE. Further, after 107, the APE determines, according to the predefined service logic, whether a further computation needs to be performed on the summation result; if yes, steps of transferring the summation result to the DPE for saving to the database and of writing the summation result as an intermediate event to the CEP instance may be performed in parallel; otherwise, only the step of transferring the summation result to the DPE for saving to the database needs to be performed.

Further, to balance a load of each computing node, operations of a whole system are coordinated by a scheduler. The scheduler determines a load status of each computing node according to collected resource information, such as current CPU usage and remaining memory, on each computing node, so as to determine a scheduling mode of each computing node, including the predefined algorithm of the BPE, the predefined service logic, and whether to enable any one or combination of PEs of various types on the computing node, and respectively schedules each computing node according to the scheduling mode of each computing node. For example, the scheduling mode includes whether to enable a BPE, an APE, or a DPE on each computing node, where if the BPE is enabled, a predefined algorithm of the BPE is further configured, for example, which KPIs are computed by the BPE; and may further include whether to enable an event filter on each computing node, where if the event filter is enabled, a subscription configuration of the event filter is determined. It should be noted that, to facilitate management and expansion, the same PE is preferably deployed on each physical node, to ensure that all physical nodes are homogeneous; however, in operation, the scheduler may decide to enable different PEs.

Further, a fault-tolerance mechanism may be considered in design. For example, a mode of N+1 may be used, that is, one computing node is used as a standby computing node; and when any one of the other computing nodes is damaged due to certain reasons, the standby computing node can immediately take over an operation of the damaged computing node, to ensure that a whole processing flow is not interrupted for a long period of time. There are multiple computing nodes and the respectively scheduling each computing node according to the scheduling mode of each computing node specifically includes: reserving a computing node as a standby computing node, and scheduling other computing nodes than the standby computing node; and when one computing node of the other computing nodes that are scheduled becomes abnormal, scheduling the standby computing node according to a scheduling mode of the abnormal computing node and cached data of the abnormal computing node.

The scheduler plays a key role in this process. The scheduler may trace resource information of each computing node and monitor a health status of each computing node in real time; when one computing node is damaged and becomes offline, the scheduler may immediately send cached data of the damaged computing node to the standby computing node, to enable the standby computing node to continue event processing in substitution of the damaged computing node. Normally, the scheduler may also be implemented on a physical node.

It can be seen that, the embodiment of the present invention uses a technical means where a BPE registers a predefined algorithm of the BPE with a CEP instance on the same computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process, and improves timeliness.

Figure 3:
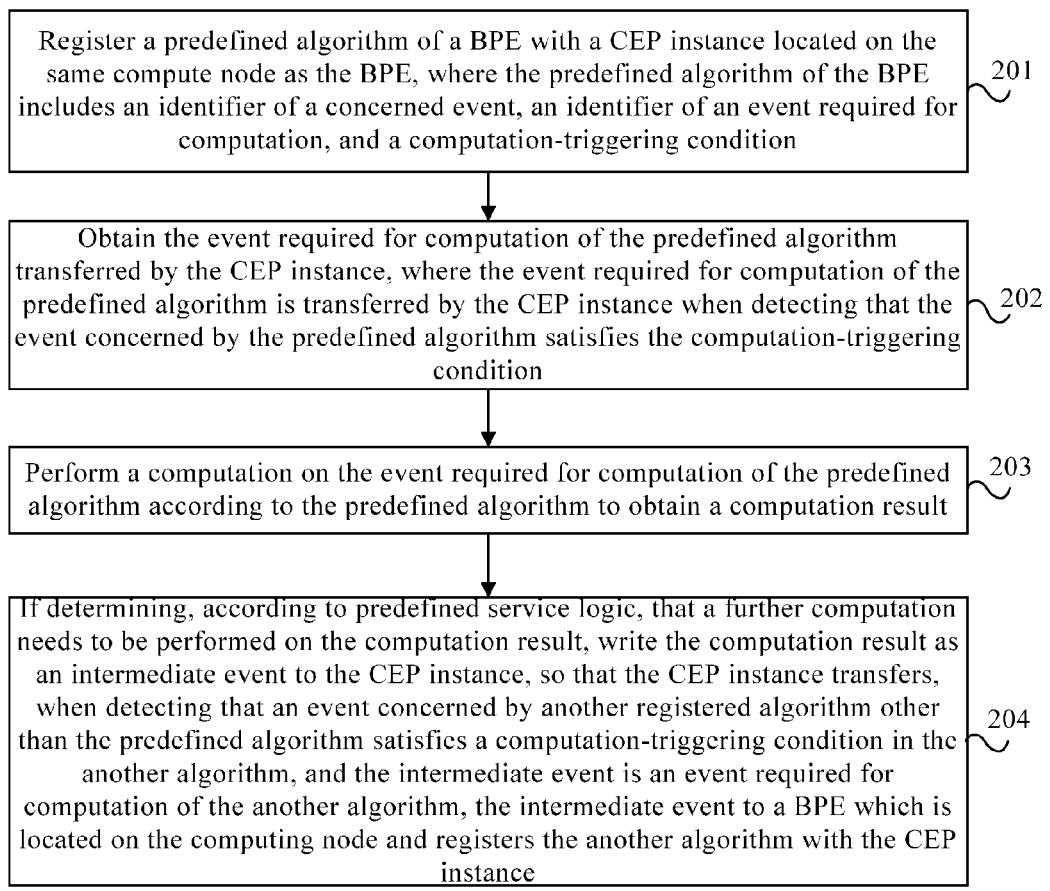
FIG. 3 is a schematic flowchart of still another method for processing data according to an embodiment of the present invention.

FIG. 3 is a schematic flowchart of still another method for processing data according to an embodiment of the present invention. The method is applied to a BPE. As shown in FIG. 3, the method includes the following steps.

201. Register a predefined algorithm of a BPE with a CEP instance located on a computing node which is the same as the computing node which the BPE is located on, where the predefined algorithm of the BPE includes an identifier of a concerned event, an identifier of an event required for computation, and a computation-triggering condition.

The identifier of the concerned event is used to identify an event concerned by the predefined algorithm, and the identifier of the event required for computation is used to identify an event required for computation of the predefined algorithm.

202. Obtain the event that is required for computation of the predefined algorithm and that is transferred by the CEP instance, where the event required for computation of the predefined algorithm is transferred by the CEP instance when detecting that the event concerned by the predefined algorithm satisfies the computation-triggering condition.

203. Perform a computation on the event required for computation of the predefined algorithm according to the predefined algorithm to obtain a computation result.

204. If determining, according to predefined service logic, that a further computation needs to be performed on the computation result, write the computation result as an intermediate event to the CEP instance, so that the CEP instance transfers, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance.

Further, after 203, the method may further include: transferring the computation result to a DPE, so that the DPE saves the computation result to a database, where the DPE is located on the computing node or another computing node.

Optionally, transferring the computation result to the DPE includes: determining, according to the predefined service logic, whether the computation result needs to be summed, and if the computation result needs to be summed, transferring the computation result to an APE, so that the APE performs a summation computation on the computation result of the BPE and a computation result of another BPE, and transfers the summation result to the DPE, where the APE is located on the computing node or another computing node, and the APE and the DPE are located on the same computing node or on different computing nodes.

Reference may be made to the embodiments illustrated in FIG. 1 and FIG. 2 for a specific implementation of the embodiment.

It can be seen that, the embodiment of the present invention uses a technical means where a BPE registers a predefined algorithm of the BPE with a CEP instance on the same computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process, and improves timeliness.

Figure 4:
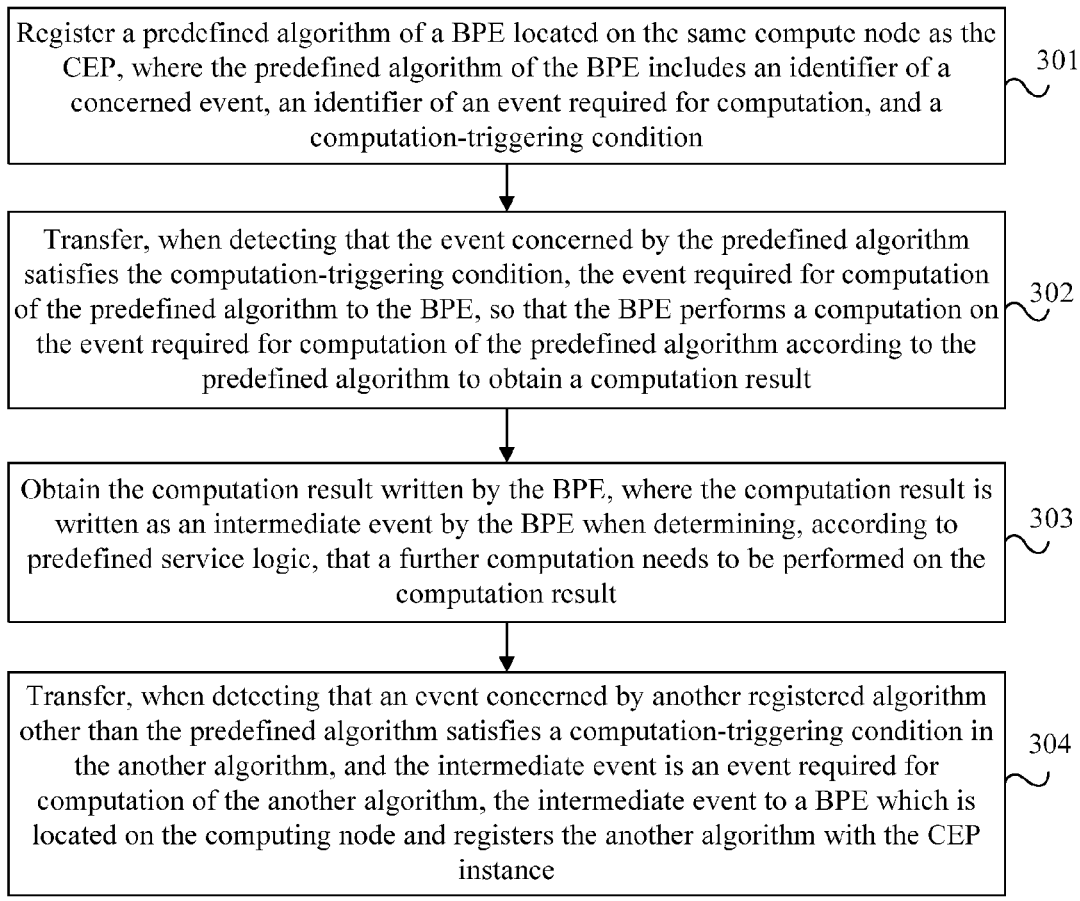
FIG. 4 is a schematic flowchart of another method for processing data according to an embodiment of the present invention.

FIG. 4 is a schematic flowchart of another method for processing data according to an embodiment of the present invention. The method is applied to a CEP instance. As shown in FIG. 4, the method includes the following steps.

301. Register a predefined algorithm of a BPE located on a computing node which is the same as the computing node which the CPE is located on, where the predefined algorithm of the BPE includes an identifier of a concerned event, an identifier of an event required for computation, and a computation-triggering condition.

Specifically, the identifier of the concerned event is used to identify an event concerned by the predefined algorithm, and the identifier of the event required for computation is used to identify an event required for computation of the predefined algorithm.

302. Transfer, when detecting that the event concerned by the predefined algorithm satisfies the computation-triggering condition, the event required for computation of the predefined algorithm to the BPE, so that the BPE performs a computation on the event required for computation of the predefined algorithm according to the predefined algorithm to obtain a computation result.

303. Obtain the computation result written by the BPE, where the computation result is written as an intermediate event by the BPE when determining, according to predefined service logic, that a further computation needs to be performed on the computation result.

304. Transfer, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node and registers the another algorithm with the CEP instance.

Optionally, the event concerned by the predefined algorithm includes an original event concerned by the predefined algorithm and an intermediate event concerned by the predefined algorithm, and before 301, the method may further include: extracting the original event concerned by the predefined algorithm from a message bus; and detecting, by the CEP instance, whether the original event concerned by the predefined algorithm and the intermediate event concerned by the predefined algorithm satisfy the computation-triggering condition.

Reference may be made to the embodiments illustrated in FIG. 1 and FIG. 2 for a specific implementation of the embodiment.

It can be seen that, the embodiment of the present invention uses a technical means where a BPE registers a predefined algorithm of the BPE with a CEP instance on the same computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process, and improves timeliness.

Persons of ordinary skill in the art should understand that all or a part of the steps of the method according to the embodiments may be implemented by relevant hardware instructed by a program. The program may be stored in a computer readable storage medium. When the program is run, the steps of the method according to the embodiments are performed. The storage medium includes various media which are capable of storing program codes, such as a read only memory (ROM), a RAM, a magnetic disk, or a compact disc ROM (CD-ROM).

Figure 5:
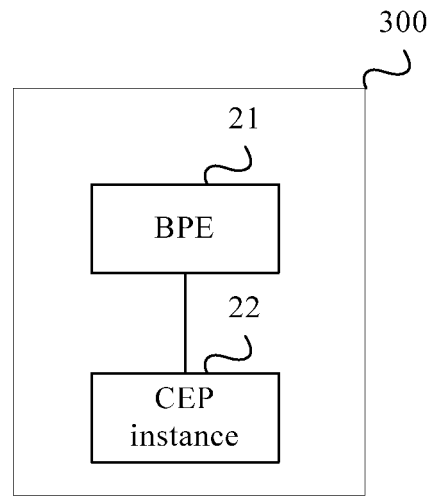
FIG. 5 is a schematic structural diagram of a computing node 300 according to an embodiment of the present invention.

FIG. 5 is a schematic structural diagram of a computing node 300 according to an embodiment of the present invention. As shown in FIG. 5, the computing node 300 includes: a BPE 21, configured to register a predefined algorithm of the BPE 21 with a CEP instance 22, where the predefined algorithm includes an identifier of a concerned event, an identifier of an event required for computation, and a computation-triggering condition; the identifier of the concerned event is used to identify an event concerned by the predefined algorithm; and the identifier of the event required for computation is used to identify an event required for computation of the predefined algorithm; and the CEP instance 22, configured to transfer, when detecting that the event concerned by the predefined algorithm satisfies the computation-triggering condition, the event required for computation of the predefined algorithm to the BPE 21, where the BPE 21 is further configured to perform a computation on the event required for computation of the predefined algorithm according to the predefined algorithm to obtain a computation result, and if determining, according to predefined service logic, that a further computation needs to be performed on the computation result, write the computation result as an intermediate event to the CEP instance 22; and the CEP instance 22 is further configured to transfer, when detecting that an event concerned by another registered algorithm other than the predefined algorithm satisfies a computation-triggering condition in the another algorithm, and the intermediate event is an event required for computation of the another algorithm, the intermediate event to a BPE which is located on the computing node 300 and registers the another algorithm with the CEP instance 22.

It should be noted that one computing node may be deployed with one or more BPEs, where the one or more BPEs all register an algorithm thereof with a CEP instance on the computing node, and each algorithm includes an identifier of a concerned event thereof, an identifier of an event required for computation thereof, and a computation-triggering condition thereof. Normally, an identifier of an event may be a name of the event.

Optionally, the BPE 21 is further configured to send the computation result to a DPE on another computing node, so that the DPE saves the computation result to a database.

Figure 6:
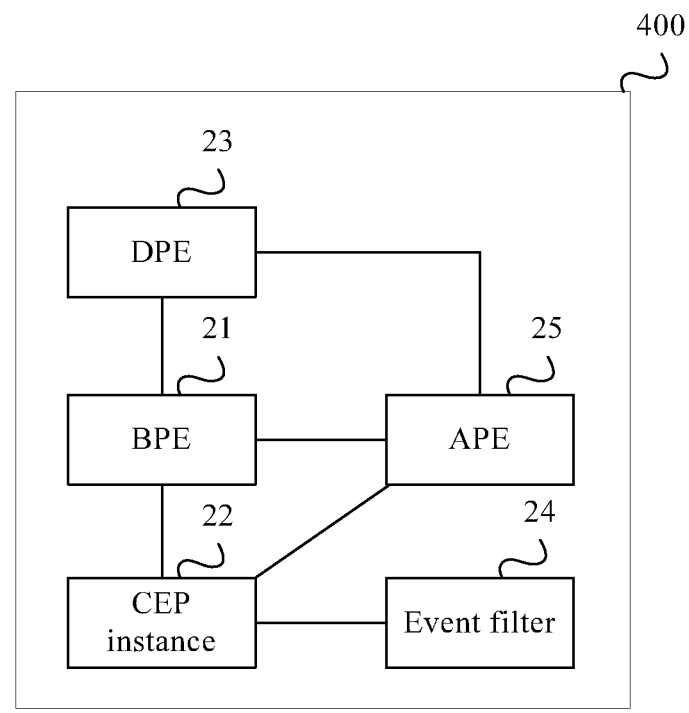
FIG. 6 is a schematic structural diagram of a computing node 400 according to an embodiment of the present invention.

FIG. 6 is a schematic structural diagram of another computing node 400 according to an embodiment of the present invention. As shown in FIG. 6, based on the computing node 300 illustrated in FIG. 5, the computing node 400 further includes a DPE 23. The BPE 21 is further configured to send the computation result to the DPE 23, so that the DPE 23 saves the computation result to a database.

Further, the CEP instance 22 is further configured to: extract an original event from a message bus; and detect whether the event concerned by the predefined algorithm among the extracted original event and the written intermediate event satisfies the computation-triggering condition.

Further, the CEP instance 22 is specifically configured to receive original events concerned by algorithms of all BPEs on the computing node 400, where the original events are sent by a message server according to a subscription instruction of a scheduler; detect whether the event concerned by the predefined algorithm among the original events and the written intermediate event satisfies the computation-triggering condition; and when detecting that the computation-triggering condition is satisfied, transfer the event required for computation of the predefined algorithm to the BPE 21; and is configured to transfer, when detecting that an event concerned by another registered algorithm other than the predefined algorithm satisfies a computation-triggering condition in the another algorithm, and the intermediate event is an event required for computation of the another algorithm, the intermediate event to a BPE 21, which is located on the computing node 400 and registers the another algorithm with the CEP instance 22; or the computing node 400 further includes an event filter 24, where the event filter 24 is configured to extract, from the message bus according to a subscription configuration of a scheduler, original events concerned by algorithms of all BPEs on the computing node 400, and transfer the original events to the CEP instance 22; and the CEP instance 22 is specifically configured to receive the original events transferred by the event filter 24; detect whether the event concerned by the predefined algorithm among the original events and the written intermediate event satisfies the computation-triggering condition; and when detecting that the computation-triggering condition is satisfied, transfer the event required for computation of the predefined algorithm to the BPE 21; and is configured to transfer, when detecting that an event concerned by another registered algorithm other than the predefined algorithm satisfies a computation-triggering condition in the another algorithm, and the intermediate event is an event required for computation of the another algorithm, the intermediate event to a BPE 21, which is located on the computing node 400 and registers the another algorithm with the CEP instance 22.

Optionally, the BPE 21 is further configured to determine, according to predefined service logic, whether the computation result needs to be summed; and if the computation result needs to be summed, send the computation result to the APE on another computing node, so that the APE performs a summation computation on the computation result of the BPE and a computation result of another BPE, and transfers a summation result to the DPE.

Optionally, the computing node 400 further includes an APE 25. The BPE 21 is further configured to determine, according to predefined service logic, whether the computation result needs to be summed; and if the computation result needs to be summed, send the computation result to the APE 25, so that the APE 25 performs a summation computation on the computation result of the BPE 21 and a computation result of another BPE 21, and transfers a summation result to the DPE 23.

In an implementation manner, the APE 25 and the DPE 23 may be located on the same computing node; in another implementation manner, the APE 25 and the DPE 23 may be located on different computing nodes.

Further, the APE 25 is further configured to write, if determining, according to the predefined service logic, that a further computation needs to be performed on the computation result, the computation result as an intermediate event to the CEP instance 22 on the same computing node.

Reference may be made to the method for processing data according to the embodiments of the present invention for a specific implementation of the computing node embodiment described above.

It can be seen that, the embodiment of the present invention uses a technical means where a BPE registers a predefined algorithm of the BPE with a CEP instance on the same computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process, and improves timeliness.

Figure 7:
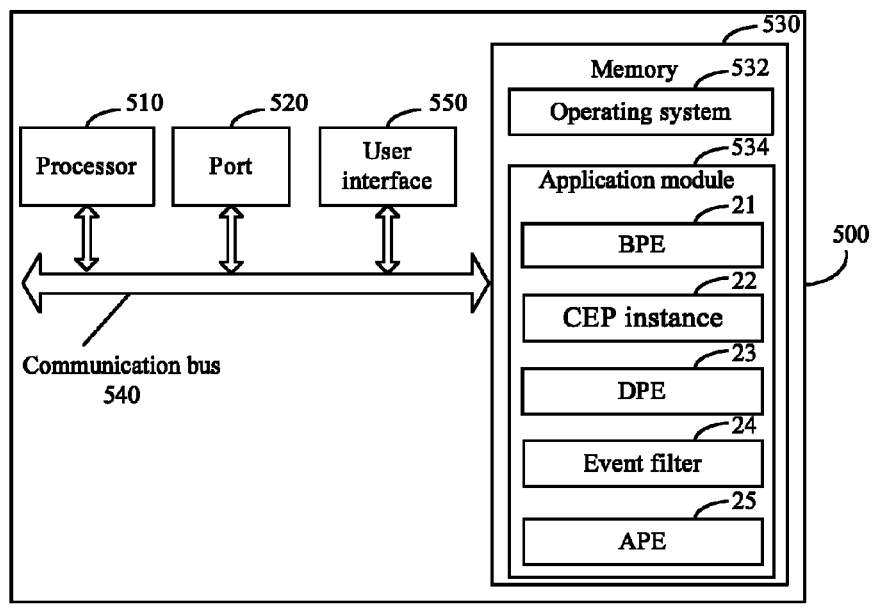
FIG. 7 is a schematic structural diagram of a computing node 500 according to an embodiment of the present invention.

FIG. 7 is a schematic structural diagram of still another computing node 500 according to an embodiment of the present invention. As shown in FIG. 7, the computing node 500 generally includes at least one processor 510, such as a central processing unit (CPU) and a digital signal processor (DSP), at least one port 520, a memory 530, and at least one communication bus 540. The communication bus 540 is configured to implement connection and communication between the apparatuses. The processor 510 is configured to execute an executable module, for example, a computer program, stored in the memory 530. Optionally, the computing node 500 may include a user interface 550, where the user interface 550 includes but is not limited to a display device, a keyboard, and a clicking device such as a mouse, a trackball, a touch panel, or a touch display screen. The memory 530 may include a high-speed random access memory (RAM), and may further include a non-volatile memory, such as at least one disk storage.

In some implementation manners, the memory 530 stores the following elements, including an executable module or a data structure, or a subset thereof, or an extension set thereof: an operating system 532, including various system programs and configured to implement various basic services and process a hardware-based task; and an application module 534, including various application programs and configured to implement various application services.

The application module 534 includes but is not limited to a BPE 21 and a CEP instance 22. Further, the application module 534 further includes a DPE 23, an event filter 24, and an APE 25.

Reference may be made to corresponding units in the embodiment illustrated in FIG. 3 or FIG. 4 for a specific implementation of various units in the application module 534, which is not described herein again.

It can be seen that, the embodiment of the present invention uses a technical means where a BPE registers a predefined algorithm of the BPE with a CEP instance on the same computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process, and improves timeliness.

Figure 8:
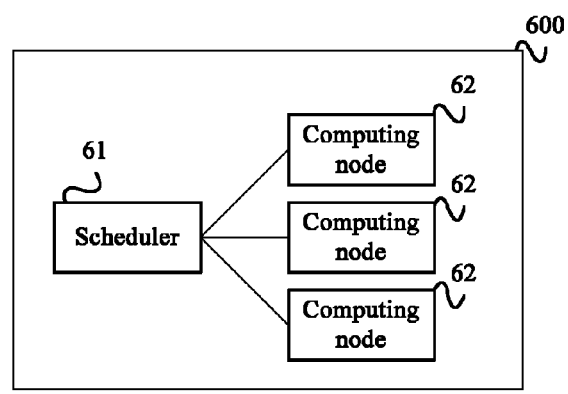
FIG. 8 is a schematic structural diagram of a distributed computing system 600 according to an embodiment of the present invention.

FIG. 8 is a schematic structural diagram of a distributed computing system 600 according to an embodiment of the present invention. As shown in FIG. 8, the system 600 includes: a scheduler 61 and at least one computing node 62, where each computing node 62 is the computing node described in the embodiments above; and the scheduler 61 is configured to collect resource information of each computing node 62, determine a scheduling mode for each computing node 62 according to the resource information, and respectively schedule each computing node 62 according to the scheduling mode of each computing node 62. It should be noted that the resource information herein includes but is not limited to CPU usage and memory occupation.

Further, the scheduling mode includes a predefined algorithm, predefined service logic, whether to enable a BPE, an APE, or a DPE on the computing node 62, and the like.

Further, when there are multiple computing nodes 62, the scheduler 61 is specifically configured to reserve a computing node as a standby computing node; schedule other computing nodes than the standby computing node; and when one computing node in the other computing nodes that are scheduled becomes abnormal, schedule the standby computing node according to a scheduling mode of the abnormal computing node and cached data of the abnormal computing node.

It should be noted that in the embodiment, the scheduler 61 may be deployed on a computing node (for example, a blade entity or a blade node in a blade system). In other words, the scheduler 61 in the embodiment may also be included in a computing node. Preferably, the computing node deployed with the scheduler 61 further includes but is not limited to a BPE 21 and a CEP instance 22, and may further include a DPE 23, an event filter 24, and an APE 25.

Reference may be made to the method for processing data according to the embodiments of the present invention for a specific implementation of the embodiment.

It can be seen that, the embodiment of the present invention uses a technical means where a BPE registers a predefined algorithm of the BPE with a CEP instance on the same computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process (which especially simplifies a process of computing a KPI/KQI), and improves timeliness.

Further, in the embodiment of the present invention, an N+1 fault-tolerance mechanism is used, that is, one computing node is used as a standby computing node; and when any computing node is damaged, the standby computing node can immediately take over an operation of the damaged computing node, to ensure that a whole processing flow is not interrupted for a long period of time.

Further, operations of the distributed computing system according to the embodiment of the present invention are coordinated by the scheduler 61. The scheduler 61 determines a scheduling mode of each computing node 62 according to collected resource information of each computing node 62, where the scheduling mode includes: a predefined algorithm, predefined service logic, and whether to enable a BPE, an APE, or a DPE on the computing node 62 (for example, the scheduler 61 determines, according to collected resource information of the computing nodes 62, which KPIs are computed on which computing node), so as to evenly distribute processing capabilities on each computing node 62, thereby providing a flexible distributed scheduling solution.

Figure 9:
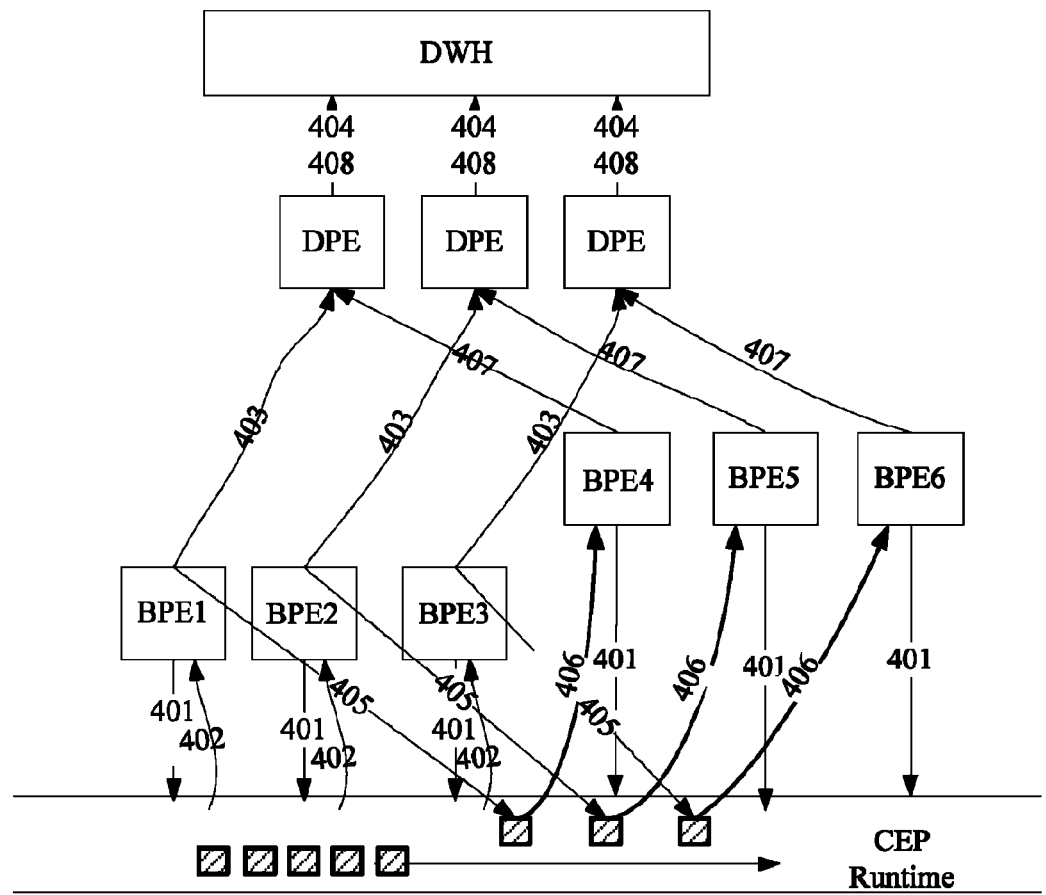
FIG. 9 is a schematic diagram of an application scenario according to an embodiment of the present invention.

FIG. 9 is a schematic diagram of an application scenario according to an embodiment of the present invention. As shown in FIG. 9, the embodiment of the present invention is applied to a scenario having a single computing node, where the single computing node is provided with a CEP instance, BPE 1 to BPE 6, and DPEs; BPE 1 to BPE 3 are responsible for computing a primary KPI, that is, computing an IE, which may also be referred to as an IE factory; and BPE 4 to BPE 6 are responsible for computing a high-level KPI, which may also be referred to as Metrics. The following steps are performed in this scenario:

401. BPE 1 to BPE 6 register their algorithms with the CEP instance, that is, create a pattern and register a callback listener with CEP runtime.

402. The CEP instance transfers, when detecting that events concerned by BPE 1 to BPE 3 respectively satisfy computation-triggering conditions in the algorithms, and events required for computation of the algorithms to BPE 1 to BPE 3.

403. BPE 1 to BPE 3 respectively perform a computation on the events required for computation thereof according to their algorithms, and report primary KPIs to the DPEs.

404. The DPEs save the primary KPIs to a database, that is, save the primary KPIs to a data warehouse (DWH).

405. BPE 1 to BPE 3 write the primary KPIs to the CEP instance.

406. The CEP instance detects that events concerned by algorithms of BPE 4 to BPE 6 satisfy computation-triggering conditions in the algorithms and the primary KPIs are events required for computation of the algorithms of BPE 4 to BPE 6, and transfers the primary KPIs to BPE 4 to BPE 6.

407. BPE 4 to BPE 6 generate high-level KPIs and report the high-level KPIs to the DPEs.

408. The DPEs save the high-level KPIs to the database, that is, save the high-level KPIs to the DWH.

It should be noted that the reporting, by BPE 1 to BPE 3, the primary KPIs to the DPE in 403, 404, and 405 to 408 may be performed synchronously.

Figure 10:
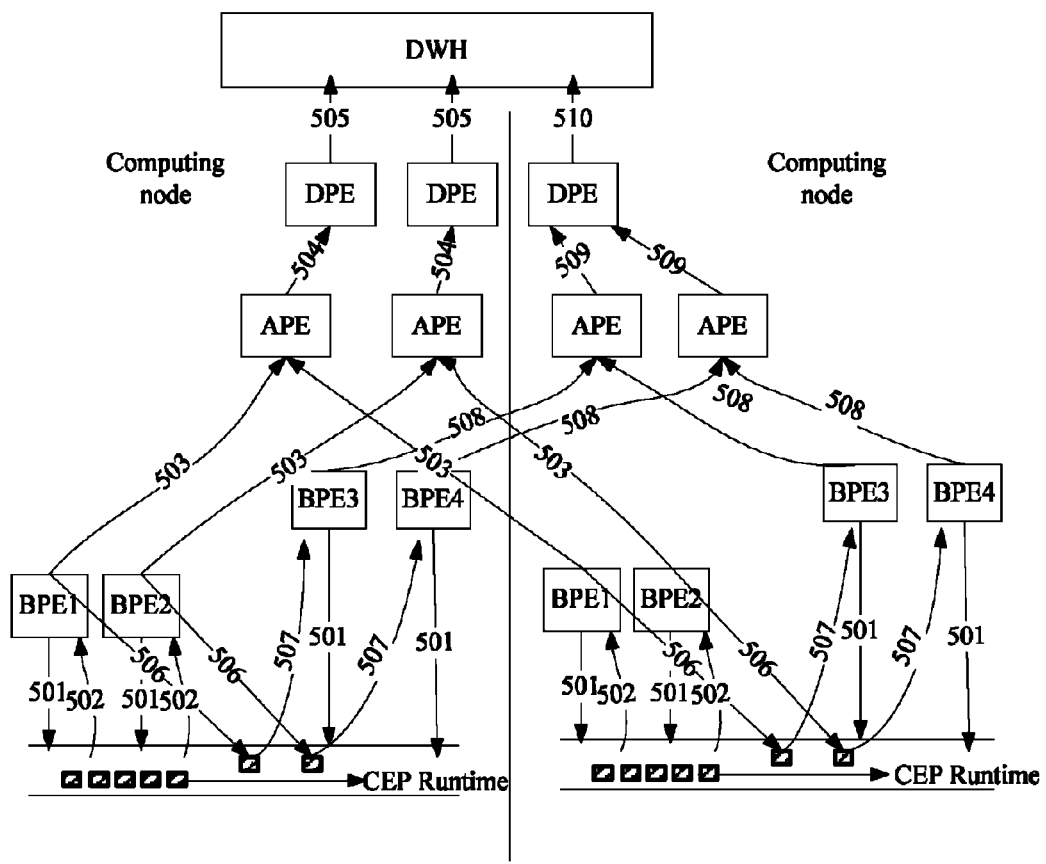
FIG. 10 is a schematic diagram of another application scenario according to an embodiment of the present invention.

FIG. 10 is a schematic diagram of another application scenario according to an embodiment of the present invention. As shown in FIG. 10, the embodiment of the present invention is applied to a scenario having multiple computing nodes, where two computing nodes are both provided with a CEP instance, BPE 1 to BPE 4, APEs, and DPEs. In this scenario, each computing node performs an operation, including computation of a primary KPI and a high-level KPI, in a scenario of a single computing node; completes a summation computation across the computing nodes by using the APEs; and then performs data storage by using the DPEs. Specifically, the following steps are performed on each computing node.

501. BPE 1 to BPE 4 respectively register their algorithms with CEP instances on their computing nodes.

502. The CEP instances transfer, when detecting that events concerned by BPE 1 to BPE 2 respectively satisfy computation-triggering conditions in the algorithms, and events required for computation of the algorithms respectively to BPE 1 to BPE 2.

503. BPE 1 to BPE 2 respectively perform a computation on the events required for computation thereof according to their algorithms, and transfer primary KPIs to the APEs.

504. BPE 1 to BPE 2 re-write the primary KPIs to the CEP instances.

505. The APEs respectively perform a summation computation on the primary KPIs and reports summation results to the DPEs.

506. The DPEs save the summation results to a database, that is, save the summation results of the primary KPIs to a DWH.

507. Each CEP instance detects that events concerned by algorithms of BPE 3 to BPE 4 satisfy computation-triggering conditions in the algorithms and the primary KPIs are events required for computation of the algorithms of BPE 3 to BPE 4, and transfers the primary KPIs to BPE 3 to BPE 4 on the computing node thereof for further processing.

508. BPE 3 to BPE 4 generate high-level KPIs and transfer the high-level KPIs to the APEs.

509. The APEs respectively perform a summation computation on the high-level KPIs and reports summation results to the DPEs.

510. The DPEs save the summation results to the database, that is, save the summation results of the high-level KPIs to the DWH.

It should be noted that the reporting, by BPE 1 to BPE 2, the primary KPIs to the APE in 503, 505, 506, 504 and 507 to 510 may be performed synchronously.

Figure 11:
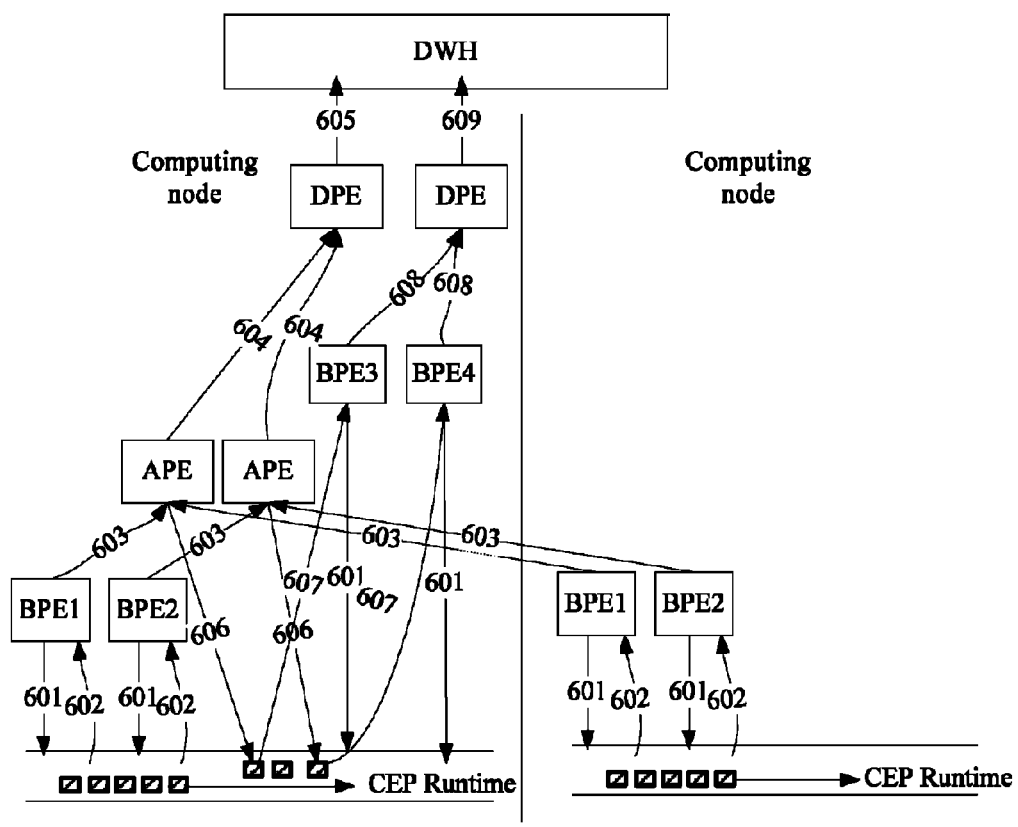
FIG. 11 is a schematic diagram of still another application scenario according to an embodiment of the present invention.

FIG. 11 is a schematic diagram of still another application scenario according to an embodiment of the present invention. As shown in FIG. 11, the embodiment of the present invention is applied to a scenario having multiple computing nodes, where one computing node is provided with a CEP instance, BPE 1 to BPE 4, APEs, and DPEs, and another computing node is provided with a CEP instance, BPE 1, and BPE 2. In this scenario, each computing node computes primary KPIs, then sums the primary KPIs across computing nodes by using the APEs, and while the APEs transfer the summation results to the DPE, writes the summation results to the CEP instance of the computing node where the APEs are located; and other BPEs compute high-level KPIs, which are saved to a database by using the DPE. Specifically, the following steps are performed in this scenario.

601. BPE 1 to BPE 4 respectively register their algorithms with CEP instances on their computing nodes.

602. The CEP instances transfer, when detecting that events concerned by BPE 1 to BPE 2 respectively satisfy computation-triggering conditions in the algorithms, and events required for computation of the algorithms respectively to BPE 1 to BPE 2.

603. BPE 1 to BPE2 respectively perform a computation on the events required for computation thereof according to their algorithms, and transfer primary KPIs to the APEs.

604. The APEs respectively performs a summation computation on the primary KPIs and reports the summation results to the DPE.

605. The DPE saves the summation results to a database, that is, saves the summation results of the primary KPIs to a DWH.

606. The APE re-writes the summation result to the CEP instance.

607. The CEP instance detects that events concerned by algorithms of BPE 3 to BPE 4 satisfy computation-triggering conditions in the algorithms and the summation result is events required for computation of the algorithms of BPE 3 to BPE 4, and transfers the summation results to BPE 3 to BPE 4 for further processing.

608. BPE 3 to BPE 4 generate high-level KPIs and transfer the high-level KPIs to the DPE.

609. The DPE saves a summation result of the high-level KPIs to a database, that is, saves the summation result of the high-level KPIs to the DWH.

It should be noted that the reporting, by the APE, the summation results to the DPE in 604, 605, and 606 to 609 may be performed synchronously.

In conclusion, the embodiment of the present invention uses a technical means where a BPE registers a predefined algorithm of the BPE with a CEP instance on the same computing node; the CEP instance transfers, when detecting that an event concerned by the predefined algorithm satisfies a computation-triggering condition of the predefined algorithm, an event required for computation to the BPE; the BPE performs a computation according to the predefined algorithm to obtain a computation result, and then, if determining that a further computation needs to be performed on the computation result, writes the computation result as an intermediate event to the CEP instance; and the CEP instance transfers, when detecting that an event concerned by another registered algorithm satisfies a computation-triggering condition of the another algorithm, and the intermediate event is an event required for computation of the another algorithm, the intermediate event to a BPE that registers the another algorithm. The CEP instance performs association of multiple events and multiple algorithms, which simplifies a computation process, and improves timeliness.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the scope of the technical solutions of the embodiments of the present invention.

What is claimed is:

1. A method for processing data, wherein the method is applied to a business processor entity (BPE), the method comprising:

registering a predefined algorithm of the BPE with a complex event processing (CEP) instance located on a computing node which is the same as the computing node which the BPE is located on, wherein the predefined algorithm of the BPE comprises an identifier of a concerned event, an identifier of an event required for computation, and a computation-triggering condition, wherein the identifier of the concerned event is used to identify an event concerned by the predefined algorithm, and wherein the identifier of the event required for computation is used to identify an event required for computation of the predefined algorithm;

obtaining the event that is required for computation of the predefined algorithm and that is transferred by the CEP instance, wherein the event required for computation of the predefined algorithm is transferred by the CEP instance when detecting that the event concerned by the predefined algorithm satisfies the computation-triggering condition;

performing a computation on the event required for computation of the predefined algorithm according to the predefined algorithm to obtain a computation result; and when determining, according to predefined service logic, that a further computation needs to be performed on the computation result, writing the computation result as an intermediate event to the CEP instance, so that the CEP instance transfers the intermediate event to a BPE which is located on the computing node and registers the another algorithm with the CEP instance, when detecting that an event concerned by another registered algorithm other than the predefined algorithm satisfies a computation-triggering condition in the another algorithm, and the intermediate event is an event required for computation of the another algorithm.

2. The method according to claim 1, wherein after performing the computation on the event required for computation of the predefined algorithm according to the predefined algorithm to obtain the computation result, the method further comprises transferring the computation result to a data storage processor entity (DPE) so that the DPE saves the computation result to a database, wherein the DPE is located on the computing node or another computing node.

3. The method according to claim 2, wherein transferring the computation result to the data storage processor entity DPE comprises:

determining, according to the predefined service logic, whether the computation result needs to be summed; and when the computation result needs to be summed, transferring the computation result to an arithmetic processor entity (APE) so that the APE performs a summation computation on the computation result of the BPE and a computation result of another BPE and transfers a corresponding summation result to the DPE, wherein the APE is located on the computing node or another computing node, and wherein the APE and the DPE are located on the same computing node or on different computing nodes.

4. A method for processing data, wherein the method is applied to a complex event processing (CEP) instance, the method comprising:

registering a predefined algorithm of a business processor entity (BPE) located on a computing node which is the same as the computing node which the CEP is located on, wherein the predefined algorithm of the BPE comprises an identifier of a concerned event, an identifier of an event required for computation, and a computation-triggering condition, wherein the identifier of the concerned event is used to identify an event concerned by the predefined algorithm, and wherein the identifier of the event required for computation is used to identify an event required for computation of the predefined algorithm;

when detecting that the event concerned by the predefined algorithm satisfies the computation-triggering condition, transferring the event required for computation of the predefined algorithm to the BPE, so that the BPE performs a computation on the event required for computation of the predefined algorithm according to the predefined algorithm to obtain a computation result;

obtaining the computation result written by the BPE, wherein the computation result is written as an intermediate event by the BPE when determining, according to predefined service logic, that a further computation needs to be performed on the computation result; and when detecting that an event concerned by another registered algorithm other than the predefined algorithm satisfies a computation-triggering condition in the another algorithm and the intermediate event is an event required for computation of the another algorithm, transferring the intermediate event to a BPE which is located on the computing node and registers the another algorithm with the CEP instance.

5. The method according to claim 4, wherein the event concerned by the predefined algorithm comprises an original event concerned by the predefined algorithm and an intermediate event concerned by the predefined algorithm, and before detecting that the event concerned by the predefined algorithm satisfies the computation-triggering condition, the method further comprises:

extracting the original event concerned by the predefined algorithm from a message bus; and detecting, by the CEP instance, whether the original event concerned by the predefined algorithm and the intermediate event concerned by the predefined algorithm satisfy the computation-triggering condition.

6. A method for processing data, wherein the method is applied to a computing node comprising a business processor entity (BPE) and a complex event processing (CEP) instance, the method comprising:

registering, by the BPE, a predefined algorithm of the BPE with the CEP instance, wherein the predefined algorithm comprises an identifier of a concerned event, an identifier of an event required for computation, and a computation-triggering condition, wherein the identifier of the concerned event is used to identify an event concerned by the predefined algorithm, and wherein the identifier of the event required for computation is used to identify an event required for computation of the predefined algorithm;

transferring, by the CEP instance when detecting that the event concerned by the predefined algorithm satisfies the computation-triggering condition, the event required for computation of the predefined algorithm to the BPE;

performing, by the BPE, a computation on the event required for computation of the predefined algorithm according to the predefined algorithm to obtain a computation result; and when the BPE determines, according to predefined service logic, that a further computation needs to be performed on the computation result, writing the computation result as an intermediate event to the CEP instance; and when detecting that an event concerned by another registered algorithm other than the predefined algorithm satisfies a computation-triggering condition in the another algorithm and the intermediate event is an event required for computation of the another algorithm, transferring, by the CEP instance, the intermediate event to a BPE which is located on the computing node and registers the another algorithm with the CEP instance.

7. The method according to claim 6, wherein after the performing, by the BPE, the computation on the event required for computation of the predefined algorithm according to the predefined algorithm to obtain the computation result, the method further comprises transferring, by the BPE, the computation result to a data storage processor entity (DPE) so that the DPE saves the computation result to a database, wherein the DPE is located on the computing node or another computing node.

8. The method according to claim 6, wherein before the detecting, by the CEP instance, that the event concerned by the predefined algorithm satisfies the computation-triggering condition, the method further comprises:

extracting an original event from a message bus; and detecting, by the CEP instance, whether the event concerned by the predefined algorithm among the extracted original event and the written intermediate event satisfies the computation-triggering condition.

9. The method according to claim 8, wherein extracting the original event from the message bus comprises:

receiving original events concerned by algorithms of all BPEs on the computing node, wherein the original events are sent by a message server according to a subscription instruction of a scheduler; or extracting, by an event filter located on the computing node, from the message bus according to a subscription configuration of a scheduler, original events concerned by algorithms of all BPEs on the computing node, and transferring the original events to the CEP instance.

10. The method according to claim 7, wherein the transferring, by the BPE, the computation result to the data storage processor entity DPE comprises:

determining, by the BPE according to the predefined service logic, whether the computation result needs to be summed;

when the computation result needs to be summed, transferring the computation result to an arithmetic processor entity (APE) so that the APE performs a summation computation on the computation result of the BPE and a computation result of another BPE and transfers the summation result to the DPE, wherein the APE is located on the computing node or another computing node, and wherein the APE and the DPE are located on the same computing node or on different computing nodes.

11. The method according to claim 10, wherein after the performing, by the APE, the summation computation on the computation result of the BPE and a computation result of another BPE, the method further comprises: writing, by the APE, the summation result as an intermediate event to a CEP instance located on a computing node which is the same as the computing node which the APE is located on when the APE determines, according to the predefined service logic, that a further computation needs to be performed on the summation result.

12. A computing node, comprising:
a business processor entity (BPE) stored in memory; and
a complex event processing (CEP) instance stored in the memory,
wherein the BPE is configured to register a predefined algorithm of the BPE with the CEP instance,
wherein the predefined algorithm comprises an identifier of a concerned event, an identifier of an event required for computation, and a computation-triggering condition,
wherein the identifier of the concerned event is used to identify an event concerned by the predefined algorithm,
wherein the identifier of the event required for computation is used to identify an event required for computation of the predefined algorithm,
wherein the CEP instance is configured to transfer, when detecting that the event concerned by the predefined algorithm satisfies the computation-triggering condition, the event required for computation of the predefined algorithm to the BPE,
wherein the BPE is further configured to perform a computation on the event required for computation of the predefined algorithm according to the predefined algorithm to obtain a computation result, and when determining, according to predefined service logic, that a further computation needs to be performed on the computation result, write the computation result as an intermediate event to the CEP instance; and
wherein the CEP instance is further configured to transfer the intermediate event to a BPE which is located on the computing node and registers the another algorithm with the CEP instance when detecting that an event concerned by another registered algorithm other than the predefined algorithm satisfies a computation-triggering condition in the another algorithm and the intermediate event is an event required for computation of the another algorithm.

13. The computing node according to claim 12, wherein the BPE is further configured to send the computation result to a data storage processor entity (DPE) on another computing node so that the DPE saves the computation result to a database, or wherein the computing node further comprises a DPE and the BPE is further configured to send the computation result to the DPE on the same computing node so that the DPE saves the computation result to a database.

14. The computing node according to claim 12, wherein the CEP instance is further configured to:
extract an original event from a message bus; and
detect whether the event concerned by the predefined algorithm among the extracted original event and the written intermediate event satisfies the computation-triggering condition.

15. The computing node according to claim 14, wherein the CEP instance is further configured to:
receive original events concerned by algorithms of all BPEs on the computing node, wherein the original events are sent by a message server according to a subscription instruction of a scheduler;
detect whether the event concerned by the predefined algorithm among the original events and the written intermediate event satisfies the computation-triggering condition; and
when detecting that the computation-triggering condition is satisfied, transfer the event required for computation of the predefined algorithm to the BPE;
either when detecting that an event concerned by another registered algorithm other than the predefined algorithm satisfies a computation-triggering condition in the another algorithm and the intermediate event is an event required for computation of the another algorithm, transfer the intermediate event to a BPE which is located on the computing node and registers the another algorithm with the CEP instance; or
wherein the computing node further comprises an event filter, wherein the event filter is configured to extract original events concerned by algorithms of all BPEs on the computing node from the message bus according to a subscription configuration of the scheduler, and transfer the original events to the CEP instance; and
wherein the CEP instance is further configured to:
receive the original events transferred by the event filter;
detect whether the event concerned by the predefined algorithm among the original events and the written intermediate event satisfies the computation-triggering condition; and
when detecting that the computation-triggering condition is satisfied, transfer the event required for computation of the predefined algorithm to the BPE;
when detecting that an event concerned by another registered algorithm other than the predefined algorithm satisfies a computation-triggering condition in the another algorithm, and the intermediate event is an event required for computation of the another algorithm, transfer the intermediate event to a BPE which is located on the computing node and registers the another algorithm with the CEP instance.

16. The computing node according to claim 12, wherein either the BPE is further configured to determine, according to predefined service logic, whether the computation result needs to be summed, and when the computation result needs to be summed, send the computation result to an arithmetic processor entity (APE) on another computing node so that the APE performs a summation computation on the computation result of the BPE and a computation result of another BPE, and transfers a summation result to the DPE, or the computing node further comprises an APE, and the BPE is further configured to determine, according to predefined service logic, whether the computation result needs to be summed, and when the computation result needs to be summed, send the computation result to the APE on the same computing node so that the APE performs a summation computation on the computation result of the BPE and a computation result of another BPE and transfers a summation result to the DPE, and wherein the APE and the DPE are located on the same computing node or on different computing nodes.

17. The computing node according to claim 16, wherein the APE is further configured to write the summation result as an intermediate event to a CEP instance on the same computing node when determining, according to the predefined service logic, that a further computation needs to be performed on the summation result.

18. A distributed computing system, comprising:
a scheduler implemented in hardware; and at least one computing node, wherein each computing node comprises a business processor entity (BPE) and a complex event processing (CEP) instance, wherein the BPE is configured to register a predefined algorithm of the BPE with the CEP instance, wherein the predefined algorithm comprises an identifier of a concerned event, an identifier of an event required for computation, and a computation-triggering condition, wherein the identifier of the concerned event is used to identify an event concerned by the predefined algorithm, and wherein the identifier of the event required for computation is used to identify an event required for computation of the predefined algorithm, wherein the CEP instance is configured to transfer the event required for computation of the predefined algorithm to the BPE when detecting that the event concerned by the predefined algorithm satisfies the computation-triggering condition, wherein the BPE is further configured to perform a computation on the event required for computation of the predefined algorithm according to the predefined algorithm to obtain a computation result, and when determining, according to predefined service logic, that a further computation needs to be performed on the computation result, write the computation result as an intermediate event to the CEP instance; and wherein when detecting that an event concerned by another registered algorithm other than the predefined algorithm satisfies a computation-triggering condition in the another algorithm and the intermediate event is an event required for computation of the another algorithm, the CEP instance is further configured to transfer the intermediate event to a BPE which is located on the computing node and registers the another algorithm with the CEP instance, and wherein the scheduler is configured to collect resource information of each computing node, determine a scheduling mode for each computing node according to the resource information, and respectively schedule each computing node according to the scheduling mode of each computing node.

19. The system according to claim 18, wherein the scheduling mode comprises a predefined algorithm, predefined service logic, and determining whether to enable a BPE, an arithmetic processor entity (APE), or a data storage processor entity (DPE) on the computing node.

20. The system according to claim 18, wherein there are multiple computing nodes, and wherein the scheduler is further configured to:
- reserve a computing node as a standby computing node;
- schedule other computing nodes than the standby computing node; and
- when one of the other computing nodes that are scheduled becomes abnormal, schedule the standby computing node according to a scheduling mode of the abnormal computing node and cached data of the abnormal computing node.

* * * * *